Patented Sept. 8, 1942

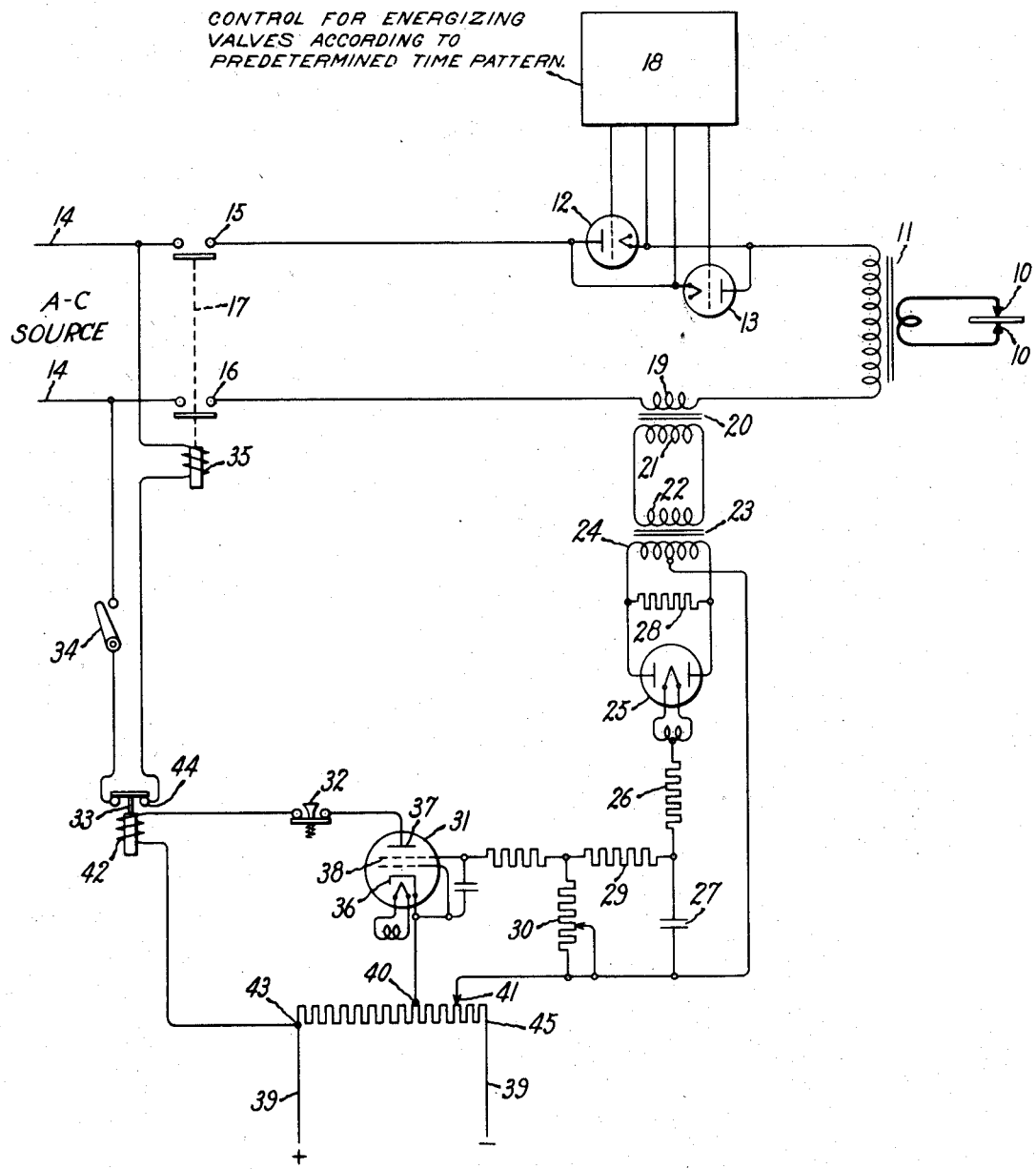

2,295,297

UNITED STATES PATENT OFFICE 2,295,297

PROTECTIVE SYSTEM

Elbert D. Schneider, Scotia, N. Y., assignor to General Electric Company, a corporation of New York Application August 19, 1939, Serial No. 291,044

1 Claim. (Cl. 250—27)

My invention relates to protective systems.

In systems embodying electric valves of the controlled type such as are employed for supplying timed applications of welding current to the electrodes of a resistance welding machine, the electric valves may be overloaded and damaged if the time during which a maximum current flow is passing through them is too great, or if the duty cycle with a particular maximum current value is too great. Furthermore, the range of adjustment of timed applications of welding current may be such that certain kinds of work may be damaged during welding. The work also may be damaged by failure of one of the two inversely connected electric valves usually employed. For example, if an electric valve fails to shut off, the timed application of welding current will be greater than desired.

It is an object of my invention to provide a protective system which may be used not only to prevent overloading of the electric valves used for supplying timed applications of welding current to a resistance welding machine but which also may be used for preventing damage to the work being welded resulting from the application of an ampere second value of welding current greater than a predetermined value.

Further objects of my invention will become apparent from a consideration of the embodiment thereof diagrammatically illustrated in the accompanying drawing.

According to my invention, a condenser provided with an adjustable leakage path is charged through a rectifier according to the current flow in the welding circuit, and consequently according to the current flow through the controlled electric valves in this circuit, and when the voltage across this condenser exceeds a predetermined value a relay circuit is operated to open the welding circuit through the agency of a circuit interrupter. The opening of this circuit breaker prevents overloading of the valves in accordance with the adjustment of the control circuit embodying this condenser.

In the arrangement illustrated, timed applications of welding current are supplied to the electrodes 10 through a welding transformer 11 and reversely connected electric valves 12 and 13 from a source of alternating-current supply 14. Contacts 15 and 16 of a circuit interrupter 17 are also included in this circuit.

The periods or number of half cycles during which the reversely connected electric valves 12 and 13 are rendered conductive and non-conductive are determined by the excitation voltages applied between their cathodes and control elements. Since various arrangements may be employed for supplying these control voltages, the particular nature of the electric valve controller 18 indicated in the drawing has not been shown in detail except to note that it energizes the electric valves according to a predetermined time pattern. The controlled electric valves are preferably electric discharge devices of the type employing an ionizable medium such as gas or vapor.

The primary 19 of a current transformer 20 is connected in circuit with the welding transformer 11 and electric valves 12 and 13. The secondary 21 of this transformer is connected to the primary 22 of a control transformer 23 whose tapped secondary 24 is connected through a rectifier 25 and a resistance 26 with a condenser 27. An adjustable leakage path for the condensers 27 is provided through a fixed resistance 29 and an adjustable resistance 30. A resistance 28 is connected across the outside terminals of the secondary 24 of control transformer 23.

It will thus be seen that condenser 27 is charged to a voltage during any single welding operation which corresponds to the ampere second value of the welding current flowing, and that furthermore, the voltage of the condenser is indicative of the average current flow or duty cycle of the welding circuit when a plurality of welds of predetermined time duration are made at certain timed intervals.

If the voltage of condenser 27 exceeds a predetermined value, it operates through a relay system to open circuit interrupter 17 through a circuit including an electric valve 31, a push button switch 32, a relay 33, a switch 34, and the operating winding 35 of circuit interrupter 17. Electric valve 31 is preferably of the type employing an ionizable medium such as gas or vapor and commonly referred to as an arc discharge device. It is provided with a cathode 36, an anode 37, and a control element 38. An adjustable voltage from the voltage dividing circuit 39 between terminal 40 and slider 41 is applied between the cathode 36 and control element 38 of electric valve 31 in opposition to the voltage appearing across the adjustable resistor 30, and serves to control its conductivity. When the voltage drop across resistor 30 is greater than a predetermined value determined by the voltage between terminal 40 and slider 41 of the voltage divider and by the characteristics of the electric valve 31, this electric valve 31 becomes conductive energizing the operating winding 42 of relay 33 through a circuit connected across the voltage divider 39 between terminals 43 and 40. This will cause relay 33 to open its contacts 44 deenergizing the operating winding 35 of circuit interrupter 17 which will then open its contacts 15 and 16 disconnecting the source of supply 14 from the welding circuit including electric valves 12 and 13. The opening of the load circuit thus prevents overloading of these electric valves.

The terminals 43 and 45 of the voltage divider 39 are connected as indicated to a suitable source of direct current supply.

The system has been illustrated in its deenergized position. When it is desired to start a welding operation switch 34 is closed. The closure of this switch connects the operating winding 35 of relay 17 across the source of supply 14 through contacts 44 of relay 33. The energization of winding 35 of circuit interrupter 17 causes it to close its contacts 15 and 16 completing a welding circuit. Thereafter timed applications of welding current according to any predetermined pattern are supplied to the welding electrodes 10 through electric valves 12 and 13, in a manner determined by the adjustment of controller 18.

The protective system illustrated may be adjusted to prevent damage to the work resulting from an adjustment of the controller 18 which supplies ampere second values of welding current greater than that required for the welding operation. With such an adjustment, the voltage charge on condenser 27 during a welding operation becomes great enough to render electric valve 31 conductive which in turn energizes relay 33 which then opens its contacts 44 and deenergizes the operating winding 35 of the circuit interrupter 17 causing it to open its contacts 15 and 16. The operation of the circuit interrupter thus prevents further welding operations until push button 32 is operated to reclose the circuit breaker. This, of course, will not be done until after controller 18 has been adjusted to give a proper value of welding current for the work being welded.

The protective system may also be adjusted to prevent overloading of electric valves 12 and 13 due to the ampere second value of a particular weld or due to the duty cycle imposed on these electric valves as a result of the making of a plurality of welds of predetermined duration which follow one another with a given frequency. When the particular ampere second value of any weld is too great, the system functions in the manner above described for protecting the work. When making a plurality of welds, each of which requires a welding current for a predetermined time which in itself will not overload the electric valves 12 and 13, the frequency at which the welds are made may overload these valves, in which case the charge accumulated on condenser 27 again reaches such a value that the relay system including electric valve 31 operates to open circuit interrupter 17 and disconnect the source of supply 14 from the welding circuit and the electric valves 12 and 13.

The protective system illustrated and described is applicable to any system wherein the flow of load current from the supply circuit is controlled through the agency of electric valves which may or may not be included directly in the circuit to the source of supply as illustrated. The control for the electric valves 12 and 13 will, of course, vary according to the nature of the operation being performed. The protective system, however, will with proper adjustment function to protect these valves no matter what time pattern for the flow of load current is employed. Although reversely connected valves have been illustrated in the system above described, it is, of course, apparent that for certain operations a single electric valve may be used.

It is, of course, apparent that many modifications may be made in the particular system illustrated and described as one embodiment of my invention. Other relay systems responsive to the voltage across condenser 27 may be employed, and the electric valves may be protected in other ways than that illustrated and described. Furthermore, other arrangements than that illustrated and described may be employed for charging the condenser in accordance with the current flowing in the load circuit. Such obvious changes and modifications are, consequently, in accordance with my invention as defined in the appended claim.

What I claim as new and desire to secure by Letters Patent of the United States is:

In combination, a load circuit, a supply circuit, electric valve means for controlling the amount of the current transmitted to and the frequency of the energization of said load circuit, said means being susceptible of operation resulting in duty cycles of current flow destructive thereto, a condenser, a continually responsive charging circuit connected to said condenser for continually charging said condenser in response to all duty cycles of current flow through said electric valve means, means for continually discharging said condenser at an adjustable rate, a circuit interrupter connected in series with said electric valve means, means including an operating winding connected in circuit with an arc discharge device and the normally closed contacts of a reset switch to a source of direct current supply for operating said circuit interrupter to disconnect said supply circuit from said electric valve means when said arc discharge device becomes conductive, and means responsive to voltages of said condenser resulting from destructive duty cycles of current flow through said electric valve means for rendering said arc discharge device conductive.

ELBERT D. SCHNEIDER.